(12) United States Patent
Stenberg

(10) Patent No.: US 9,547,293 B2
(45) Date of Patent: Jan. 17, 2017

(54) CONTROL SYSTEM FOR ELECTROMAGNETIC PUMPS

(71) Applicant: Xavitech AB, Härnösand (SE)

(72) Inventor: Johan Stenberg, Härnösand (SE)

(73) Assignee: Xavitech AB, Härnösand (SE)

( * ) Notice: Subject to any disclaimer, the term of this patent is extended or adjusted under 35 U.S.C. 154(b) by 0 days.

(21) Appl. No.: 14/321,216

(22) Filed: Jul. 1, 2014

(65) Prior Publication Data

US 2014/0316590 A1 Oct. 23, 2014

Related U.S. Application Data

(63) Continuation of application No. 12/085,089, filed as application No. PCT/SE2006/001277 on Nov. 12, 2006, now Pat. No. 8,807,965.

(30) Foreign Application Priority Data

Nov. 15, 2005 (SE) ...................... 0502508

(51) Int. Cl.
*F04B 43/04* (2006.01)
*G05B 15/02* (2006.01)
(Continued)

(52) U.S. Cl.
CPC ........... *G05B 15/02* (2013.01); *F04B 43/0081* (2013.01); *F04B 43/04* (2013.01); *H02K 11/22* (2016.01);
(Continued)

(58) Field of Classification Search
CPC ......... F04B 13/00; F04B 43/04; F04B 49/065; F04B 49/103; F04B 49/12; F04B 2203/0401; F04B 2203/0402; F04B 2203/0405; F04B 2203/0409; F04B 43/0081; F04B 2201/0201; G05B 15/02; H02K 33/02; H02K 33/10; H02K 33/12; H02K 33/14; H02K 11/22; H02P 25/027; H02P 25/032

(Continued)

(56) References Cited

U.S. PATENT DOCUMENTS 3,411,704 A * 11/1968 Hilgert ................. G05D 7/0641
236/84
3,610,782 A * 10/1971 McGuire,III ........ H02P 29/0016
417/316

(Continued)

FOREIGN PATENT DOCUMENTS

| EP | 211474 | 2/1987 |
| EP | 0578999 | 1/1994 |
| WO | 00/22298 | 4/2000 |

OTHER PUBLICATIONS http:www.miltonroy-europe.com/overview.gb-p105.html.

(Continued)

*Primary Examiner* — Devon Kramer
*Assistant Examiner* — Joseph Herrmann
(74) *Attorney, Agent, or Firm* — Dilworth & Barrese, LLP

(57) ABSTRACT

A control system and method for controlling electromagnetic drive pumps as, for example, electromagnetic driven membrane pumps are provided in which the control system is formed by at least one microprocessor and at least one sensor, whose microprocessor controls the power supply to at least one electromagnet whose changes in emitted magnetic field causes at least one moving part, directly or indirectly, to perform an oscillating pumping movement. The control system includes at least one positioning sensor which senses the moving part's position in the electromag- (Continued)

netic driven pump. By using the positioning sensor's measurements, the pump can be controlled with great accuracy.

15 Claims, 3 Drawing Sheets

(51) Int. Cl.
    *H02K 33/10*     (2006.01)
    *F04B 43/00*     (2006.01)
    *F04B 13/00*     (2006.01)
    *F04B 49/06*     (2006.01)

(52) U.S. Cl.
    CPC ............... *H02K 33/10* (2013.01); *F04B 13/00* (2013.01); *F04B 49/065* (2013.01); *F04B 2201/0201* (2013.01); *F04B 2203/0402* (2013.01)

(58) Field of Classification Search
    USPC .................................................. 318/127–128
    See application file for complete search history.

(56) References Cited

U.S. PATENT DOCUMENTS

| | | | |
|---|---|---|---|
| 3,864,695 A * | 2/1975 | Nagashima | B43L 13/024 318/128 |
| 4,523,902 A | 6/1985 | Wally | |
| 4,599,052 A | 7/1986 | Langen et al. | |
| 4,702,674 A | 10/1987 | Fontaine et al. | |
| 4,749,553 A * | 6/1988 | Lopez | G01N 33/4972 180/272 |
| 4,874,299 A | 10/1989 | Lopez et al. | |
| 4,966,533 A * | 10/1990 | Uchida | F04B 43/04 417/413.1 |
| 5,017,854 A * | 5/1991 | Gully | F04B 35/045 318/599 |
| 5,047,154 A | 9/1991 | Comstock et al. | |
| 5,056,036 A | 10/1991 | Van Bork | |
| 5,259,731 A | 11/1993 | Dhindsa et al. | |
| 5,641,270 A | 6/1997 | Sgourakes et al. | |
| 5,809,157 A | 9/1998 | Grumazescu | |
| 6,174,136 B1 | 1/2001 | Kilayko et al. | |
| 6,196,172 B1 * | 3/2001 | Cosfeld | F01L 9/04 123/90.11 |
| 6,280,147 B1 | 8/2001 | Kilayko et al. | |
| 6,373,678 B1 | 4/2002 | Bartsch et al. | |
| 6,390,039 B2 | 5/2002 | Fuwa | |
| 6,412,456 B2 * | 7/2002 | Kumaki | F01L 9/04 123/90.11 |
| 6,468,042 B2 | 10/2002 | Moller | |
| 6,535,308 B1 * | 3/2003 | BuAbbud | H04B 10/43 372/101 |
| 7,399,165 B2 | 7/2008 | Horiuchi et al. | |
| 8,272,850 B2 | 9/2012 | Stenberg | |
| 8,807,965 B2 * | 8/2014 | Stenberg | F04B 43/0081 417/413.1 |
| 2001/0033795 A1 | 10/2001 | Humpheries | |
| 2007/0040454 A1 | 2/2007 | Freudenberger et al. | |
| 2007/0041845 A1 | 2/2007 | Freudenberger | |
| 2011/0044829 A1 | 2/2011 | Stenberg | |
| 2011/0129372 A1 | 6/2011 | Stenberg | |
| 2012/0051956 A1 | 3/2012 | Grip | |

OTHER PUBLICATIONS

Milton Roy, MRoy A & B ElectronicCapacityControl. 00002 ed. vol. 339. 2000.Print Ser. 000.
Siemens STEP Basics of AC Motors.

* cited by examiner

CONTROL SYSTEM FOR ELECTROMAGNETIC PUMPS

BACKGROUND OF THE INVENTION

Technical Field

The present invention concerns a control system for operating electromagnetic pumps. More specifically, the invention relates to a control system and method in accordance with the description herein.

Technical Background

Electromagnetic pumps that apply pressure or negative pressure are found in a large variety of variations and sizes and are used in many different applications, everything from large industrial pumps to very small pumps for medical purposes. The diverse areas of use for electromagnetic pumps such as membrane pumps results in a plethora of requirements put upon the performance of such pumps. A significant problem for buyers of membrane pumps is that the supply of pumps from manufacturers is to a large degree standardized to just a few different models, largely because pump manufacturers seek economies of scale in their production. The limited diversity of pumps means that there exists a need for more efficient control systems. This would allow manufacturers to satisfy specific user needs in a much better way and thereby reduce costs as well as improve the performance of products that contain a pump. Today there is a lack of good quality, simple, standardized, low maintenance and inexpensive control systems for electromagnetic pumps.

It is quite common that membrane pumps are driven with the aid of one or more electromagnets. An electromagnet produces a back and forth movement that for example causes the membrane to produce a pumping movement. An advantage with electromagnetic driven membrane pumps is that they are more closely coupled to the membrane which renders it possible for example to vary the length of stroke, which can not be accomplished by membrane pumps powered by rotating motors with an eccentric. Furthermore, electromagnetic pumps are comprised of very few details which make them inexpensive to manufacture. Electromagnetic pumps are still less common despite this because of several problems that result in the fact that an electromagnet is not obviously better at powering a membrane pump compared with a rotating motor. A significant problem with electromagnetic driven pumps is that they are difficult to gear up for higher pressure without introducing lever that entail more details and additional friction. Yet another problem is that it is difficult to optimize electromagnetic pumps to turn precisely at their closing position without hitting the bottom of the pump. Hitting the bottom results in a shorter life span and turning to early results in poorer pressure performance. Electromagnetic pumps are therefore often pre-set to a certain pressure that can not be changed, which in turn is often a problem because this results in significant limitations. Still another problem with electromagnetic pumps is that they are more complicated to control than pumps with a rotating motor and they often can only be controlled by the amount of voltage.

Additional problems that exist originate from the actual implementation and use of pumps. During the use of oscillating pumps such as electromagnetic pumps and pumps with rotating motors with eccentrics, oscillations are created in pressure and flow. These are in many cases unwanted and can for example disturb measuring sensors which measure the pumped medium. So called air capacitors, a large vessel or volume, are often used to even out the flow in order to minimize the disrupting oscillation. This is not however always a good solution because they take into use a lot of space and the pumped medium risks being mixed in these vessels before the medium finally reaches the gas sensor. This reduces for example the sensitivity and the response time of the measuring system. Another problem with the use of pumps is that flow is affected by how high the pressure is in the system. It is often desired that flow and pressure be constant. The performance of the pump depends a lot on if the surrounding pressure for some reason changes. This means that one must measure pressure or flow or both with good precision and in many applications this is necessary in order to control the pump. This increases the cost and complexity of the system. Yet another problem is when several pumps must be coordinated in order to attain a common result, such as the mixing of gases. This creates very complex systems with several flow meters, pressure meters and valves. It is also a problem to acquire a control system that is completely free from calibration and that is not affected by operation and aging.

Because of the above mentioned problems systems and products that include pumps often give rise to very intricate designs comprised of many details making production very costly.

PRIOR ART

In the Swedish patent application SE7503408 optical sensors are used for securing that the pump does not reach its closing position by digitally reading a logical one or logical zero in order to stop or start the electromagnet, however this solution differs greatly from the solution described herein, because their solution lacks information on what happens during all the remaining time that is comprised of the time the movable part is in all the other positions than just the two closing positions that are read. Nor does it have an incremental disbandment which is necessary for freely being able to vary the increments stroke for stroke during the time the pump pumps. It was suggested that a hole which can be moved with the aid of a thread be used for variable increments. Patent document U.S. Pat. No. 6,616,413 describes a sensor-based control system that automatically adjusts the resonance frequency of an electromagnetic pump through induction.

SUMMARY OF THE INVENTION

Even if existing electromagnetic driven membrane pumps many times achieve their purposes, none of these combine the advantages from both membrane pumps driven by a rotating motor and membrane pumps driven by electromagnets without any of the disadvantages entailed by both types. The purpose of the present invention is therefore to bring about a membrane pump which encompasses the advantages from the respective types of membrane pumps essentially without any of there disadvantages. This system differs greatly from the system described herein, because their system lacks the precision and accuracy needed to solve all the problems described herein and essentially aims to optimizing efficiency.

All the earlier mentioned problems result in that there exists a great potential for improving control systems for electromagnetic pumps. By utilizing the wide controllability and very direct coupling to the power source of electromagnetic pumps, it is possible to solve all the above problems in an eloquent manner and greatly improve and increase the areas of use for electromagnetic pumps, compared to pumps with a rotating motor as well as currently existing electromagnetic pumps which lack the control system described herein.

BRIEF DESCRIPTION OF THE DRAWINGS

The invention will be described in detail in the following text with reference to the enclosed schematic drawings which show, in an exemplifying purpose, the current preferred embodiments of the invention.

DESCRIPTION OF THE PREFERRED EMBODIMENTS

The Control System

Figure 1:
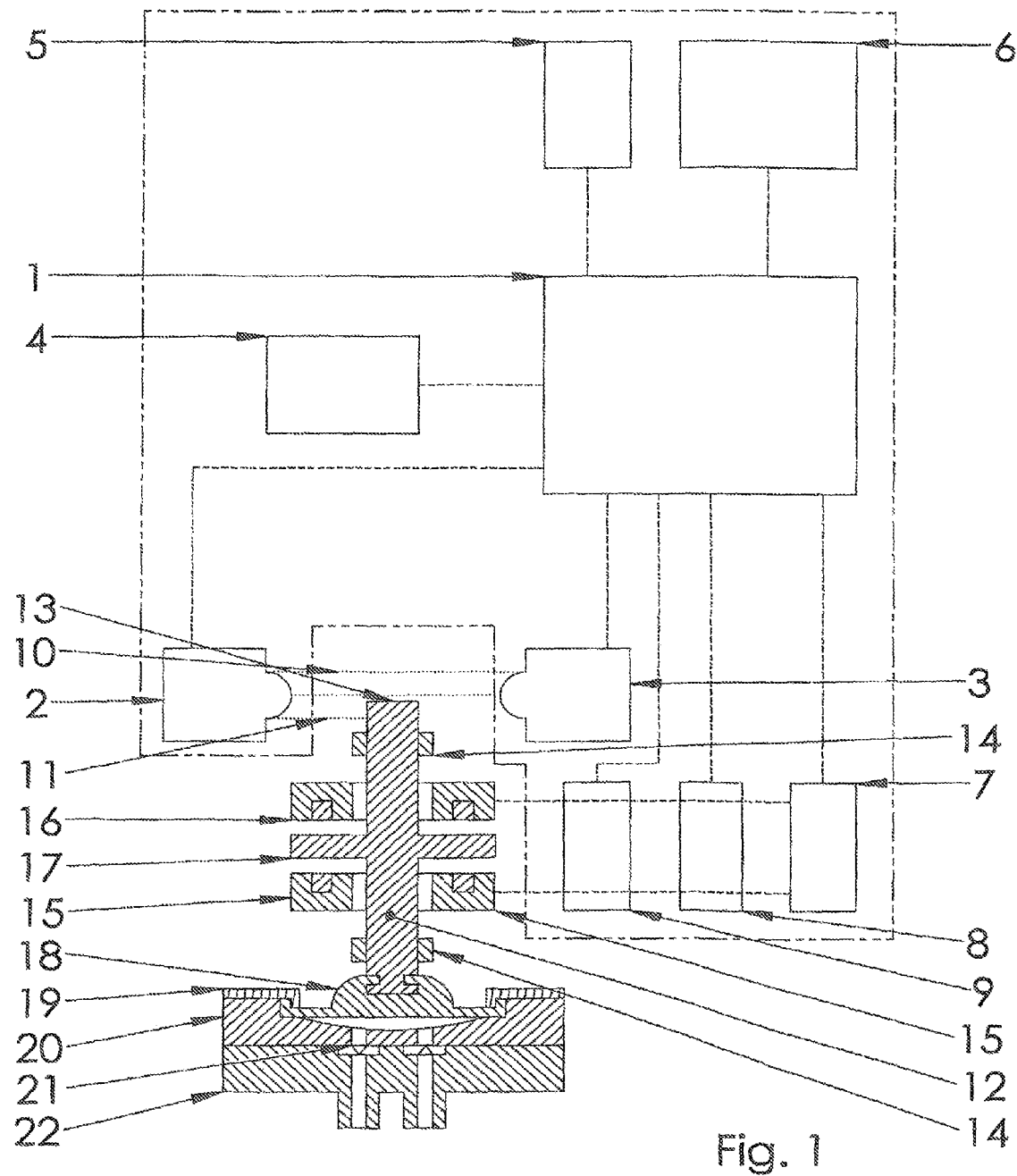
FIG. 1 shows a control system according to the first executed form of the present invention.

With reference to FIG. 1 a control system is shown according to the present invention. The system is driven by an electric power source that provides control voltage and supplies the system, via a voltage reader 5, with the energy needed to drive the system. The system consists of at least one microprocessor 1 that gathers all the data, stores the data, computes the data and sends the data onward. Data is gathered from at least one position sensor. Preferably the control system also contains at least one temperature sensor 4, at least one electric current meter 9 (ammeter) and at least one voltage measurer 8 (voltmeter). In alternative embodiments additional variations of the sensors may be utilized. The gathered data from the sensors are computed by the microprocessor and thereafter control signals are sent to an electric circuit 7 which in turn controls the electromagnets power supply. The electromagnets affect in turn a moving part whose position and movement is detected by at least one position sensor that preferably consists of at least one optical transmitter 2 that sends out light to at least one optical receiver 3. The control system also contains a network interface 6 that allows for several pumps to be controlled and/or for their cooperation with each other.

The Membrane Pump

The control system is designed to control several different types of electromagnetic driven pumps. In the exemplifying design of FIG. 1 the control system is used to control an electromagnetic driven membrane pump. The example should not be seen as a limitation on patent protection for a control system in accordance with the present invention because the control system is essentially designed to be used for all electromagnetic driven pumps. The membrane pump consists of a gable 22 that also contains circular hose connections. The gable 22 is joined together with a flange 20. In the space between the gable 22 and the flange 20 exist a schematic drawing of a clack valve (check valve, non-return valve, one-way valve or other device for preventing backflow) 21 which can be comprised of for the purpose appropriate type of clack valve. A membrane 18 is clamped between the flange 20 and an additional flange 19. This provides for the formation of a pump chamber between the membrane and flange 20 with an intake and an outlet. An axle (the moving part) 12 is connected (fastened) to the membrane. The axle is suspended in slide bearings 14 and is designed to move in an axial direction. The axle has a wider part 17 that stretches out in radial direction. The wider part 17 can attract either of the two circular electromagnets 15 or 16 that surround the axle. The electromagnet attracts the axle's wider part 17 by the axle's wider part moving closer to the electromagnet because of the magnetic field formed by the electromagnet. Through alternately activating the electromagnets 15 and 16 an oscillating pumping movement can be established in an axial direction. Alternatively, one of the electromagnets can be replaced by a spring.

Figure 2:
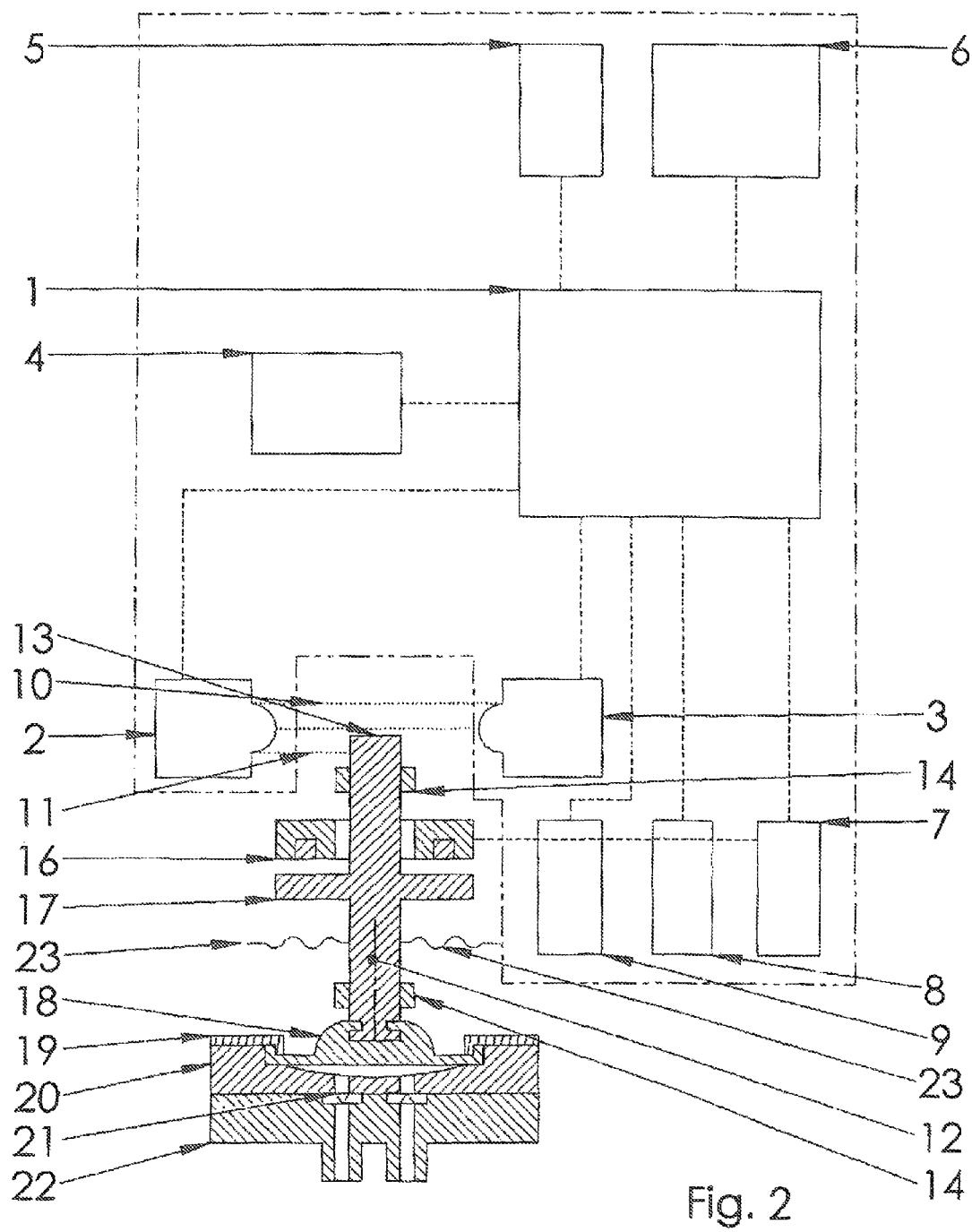
FIG. 2 shows a control system according to the second executed form of the present invention.
Figure 3:
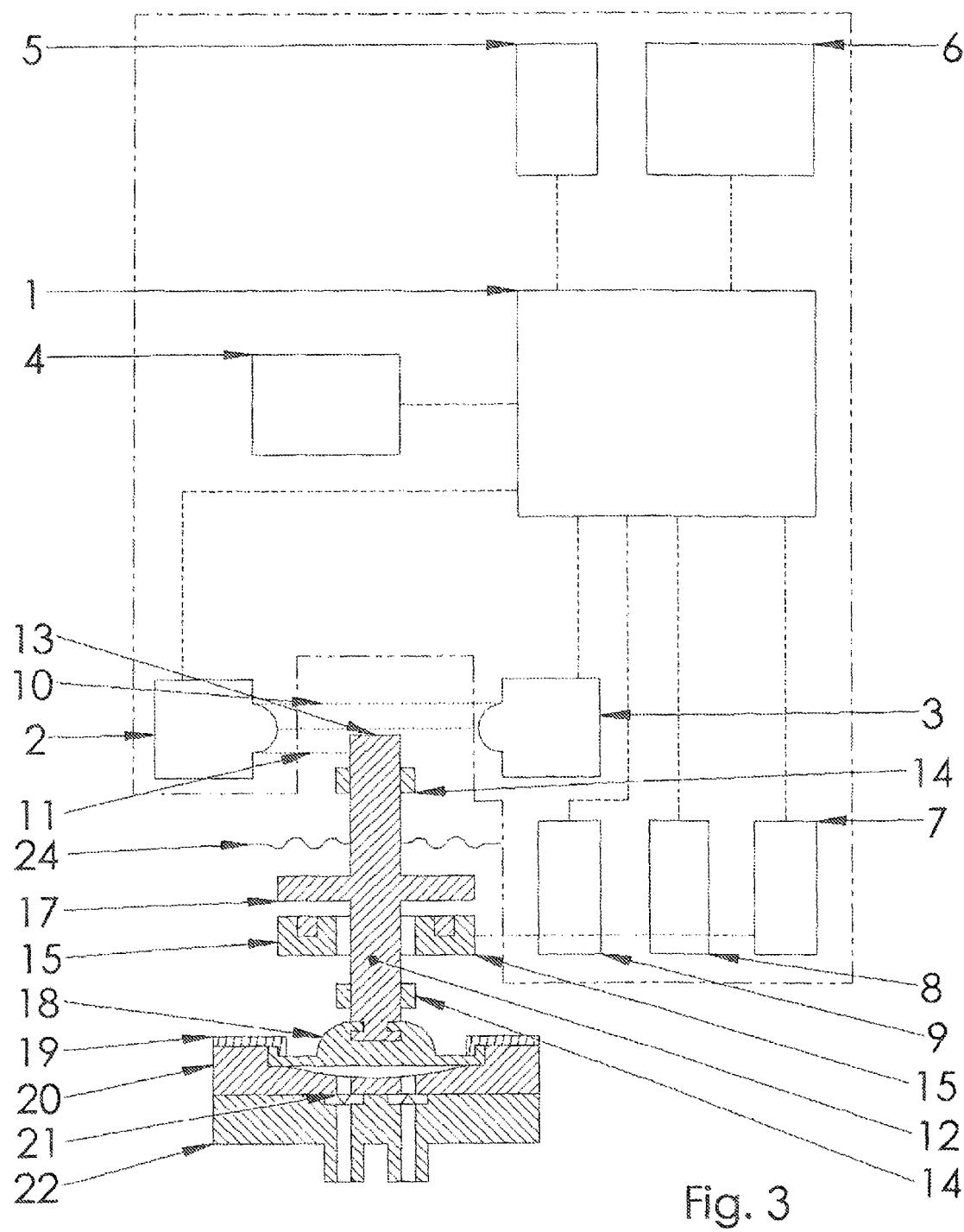
FIG. 3 shows a variant of the control system according to the second executed form of the present invention.

FIG. 2 shows the embodiment where electromagnet 15 has been replaced by spring 23, with all other components remaining the same. FIG. 3 is a view similar to the embodiment illustrated in FIG. 2, but with position of the electromagnet and spring reversed. In other words, spring 24 replaces electromagnet 16 instead of electromagnet 15 in the embodiment illustrated in FIG. 3. Otherwise, all other components remain the same in the embodiment illustrated in FIG. 3.

The Positioning Function of the Control System

The axial movement of the moving part that is created by the electromagnets' emitted magnetic field comes to different extent, at position 13 on the axle (the moving part) to obstruct the light 10, 11 sent from the optical transmitter 2 to the optical receiver 3. The moving part will in all positions to some extent always shade the light between the optical receiver and the optical transmitter. The obstructed light results in a shadow whose size can be measured as analogous voltage at the receiver. The analogous voltage results in that the positioning optical sensor will have unlimited resolution. The optical receiver measures all light within all the wavelengths it is sensitive to, thus light can come from other directions and other sources and not just from the transmitter of the optical receiver. To remove these sources of disturbance, the optical transmitter is turned on and off with a very high frequency intensity so that the system can often control how much light that actually comes from the optical transmitter. Suitably, an optical transmitter and an optical receiver are chosen that together have a light width (the width of the emitted or received cone of light) comprised of the distance between 10 to 11 that is larger than the pump's stroke length. A longer stroke length can however be measured by making a conic end on the axle (the moving part), but this however results in higher precision requirements on the axle's suspension so that no radial play occurs which the system might then misinterpret as an axial movement. The system has a temperature sensor 4 to compensate for possible changes (temperature drifting) in the electromagnet and the optical positioning sensor.

The Automatic Calibration of the Positioning Function

The system also includes a function for automatic calibration of measurements to compensate for possible sources of error in the optical measurement of the moving part's position. The source of errors in the optical measurements could be caused by for example aging and wear during the operation of the pump. The automatic calibration is achieved by a mechanically well defined zero position or by means of the electromagnets mechanically setting the pump in its turning positions and thereafter optically measuring and updating the information on where the turning positions are expressed with the optical system's indication of position. The system is in this way protected from for example aging, operation or filth that with time could create differences in the analogous values measured on the optical receiver. In this way the whole chain from the operation of the optical transmitter to the reception of the optical receiver is calibrated.

Control Voltage

The control system for the pump receives its power via a voltmeter 5. By measuring the operational voltage the system is powered by, the operational voltage's level also functions as control information for the pump, and in this way it becomes compatible with pumps operated by regular electrical direct-current (DC) motors, which are the most common existing type of pumps on the market today. It is very advantageous to replace different types of pumps with the controlled pump according to present invention if the need arises to replace other pumps in existing equipment. A description on how this works will be described below.

The Pump (Control System) in Function

The pump (the control system) receives an external incoming voltage of six volts when connected to the voltmeter 5. The same voltage is paralelly connected to the microprocessor 1 at which it will turn on. The microprocessor begins by measuring the temperature of the system in order to use the temperature to compensate for possible measurement errors that originate from temperature. This takes place continuously in the software and is not mentioned further in this description. The microprocessor causes the optical transmitter to flash with a frequency of preferably 10 kHz. The microprocessor activates thereafter electromagnet 15 with help from the operation of electromagnets 7.

The electromagnet pulls the pump's axle (moving part) in an axial direction toward the electromagnet 15 until the moving part reaches its turning position where it mechanically links with the electromagnet. Thereafter the microprocessor measures the voltage at the optical receiver 3. The voltage is both measured when the optical transmitter is turned on and off. The microprocessor calculates the differences in voltage and stores it in the memory as a defined turning position for the pump. The same procedure is executed for the other turning position by first deactivating electromagnet 15 and instead activating electromagnet 16. The microprocessor now knows both end positions of the pump and can thereby avoid striking against the turning positions. The microprocessor will now continuously measure the size of the shadow to continuously control exactly where between the turning positions the axle is found. With help from a so called linearity table the voltage differences can be translated to a specific position despite of that the size of the shadow is not totally linear in relation to the voltage differences. Then the microprocessor measures the voltmeter 5 which shows six volts. The microprocessor has for example earlier been programmed that an incoming voltage of six volts gives a full stroke length and a stroke frequency of 6 Hz. The microprocessor has in this example been preprogrammed to recognize that the incoming voltage in volts indicates the stroke frequency. The microprocessor then causes the axle to oscillate by alternately activating the electromagnets back and forth. It uses the optical positioning sensor to change direction in time so that the pump avoids striking its end points which would cause wear and tear. It will adjust the speed of the pump so that a frequency of 6 Hz is achieved. The adjustment of speed can for example be regulated with higher voltage to the electromagnet. The method used in this preferred solution, is that by using an essentially higher frequency than the pump's speed, interrupt, turn off and on, the voltage coming in as voltage control, six volts in this case, with the aid of the electrical circuit 7 that controls the power supply to the electromagnet. It is therefore possible to minimize the number of components in the design and to avoid regulation of the voltage and therefore it is also possible to avoid energy losses in form of voltage drops in the control electronics 7.

If the operation voltage for the control system in this case is raised to seven volts the system's control program will maintain the full stroke length but raise the stroke frequency to seven Hz accordingly. In this way it is possible to imitate a direct-current (DC) motor and thus have the possibility to replace existing direct-current (DC) driven pumps on the market. Changes in operation voltage can of course control other things than frequency. Frequency can be held constant and the stroke length can be controlled by the operation voltage. Furthermore the operation voltage can control the actual flow or pressure which will be described later herein. A linear pump function can then be achieved.

The Network Interface

The operation voltage can also be kept constant and the pump can instead be controlled through the network interface 6 with the existing communication/network protocol that the pump has. The network interface is designed so that several control system can be controlled together and cooperate with each other and with other external sensors and systems. This allows for pumps to be controlled together to cooperate with each other, and also with other external sensors and systems. Through cooperation between several control system larger pumps can be operated by several or larger electromagnets. By using the network interface several pumps can work in parallel with the aim that they can together produce a larger flow. Even connecting in series provides a satisfactory effect for improving pressure performance. Parallel coupled pumps can through the control system's network interface work time delayed to compensate flow ripples through by letting the first pump pump out when the second pump pumps in. More than two pumps even out the ripples further. A further effect of network functionality is that the same bus can control several pumps with less electronics and connections. The network interface can also be wireless.

Calculation of Pressure

The control system can also calculate from the pressure the pump generates. Somewhat simplified the method for measuring pressure is described according to the following. The size of the acceleration, in the direction that the electromagnet pulls the moving part, is a measure in the difference in force between the force that the electromagnet produces to pull the membrane and the counter-force that pulls the membrane in the opposite direction which stems from the positive pressure or negative pressure found in the pump chamber.

With the aid of the position sensor it is known where the moving part is, how fast it is moving and its acceleration at any given moment The force that the electromagnet produces at every distance to the axel is already known by way of measuring (calibration). When the acceleration is measured and compared with the known force the formula $A=F1-F2$ can be used to calculate the unknown force produced by the pressure in the pump. Later, when the force produced from the pressure is known it is possible to calculate the pressure's size with the formula $P=F/A$.

Of course there are other factors which influence as for example friction in bearings, elasticity of the membrane, further elasticity, air resistance and temperature. However, the importance of these parameters will depend on how every pump is constructed, and this is why they are left out of this simplified description.

Apart from earlier mentioned areas of use, the control system can also be used to measure the pump's flow by way of flow performance/stroke at different pressures is measured and stored in the pump during production. Thus the flow can be calculated with the aid of the formula, Flow=Stroke frequency*Flow performance at the specific pressure.

Examples of Application for Pumps Equipped with the Control System

The control system is used to control the pump in conjunction with dosage. The pump can dose because the flow performance/stroke at every specific pressure is known from calibration during production. The pumped volume=the number of strokes*flow performance/stroke at the specific pressure.

The control system can also be used to control the pump during the mixing of different mediums. With the aid of the control system the pump's flow measuring function together with the network function can be used to create a very simple and functional system that can with high precision mix different mediums.

The control system can be used to gear up the pump. The pump can pump at full stroke length and later, when it is needed, reduce the stroke length and oscillate close to the operating electromagnet. This will achieve a significantly larger force to operate the membrane at which the emitted pressure can gear up.

Even if the preferred embodiment of the control system and the method for controlling the control system have been described in detail herein, variations and smaller changes within the scope of the invention may become known for those skilled in the art and all such cases will be considered to fall within the scope of the following claims.

What is claimed is:

1. An electromagnetic driven pump comprising, a control system including a microprocessor (1) and at least one sensor,
    wherein the microprocessor controls the energy feed to a single electromagnet (15) at which changes in an emitted magnetic field causes a moving part (12) of the electromagnetic driven pump to perform a reciprocating movement to achieve a pumping effect and at which at least one position sensor is placed to sense the position of the moving part (12) in the electromagnetic driven pump,
    the electromagnet (15) is oriented to direct the emitted magnetic field entirely in an axial direction of the moving part (12) when activated, wherein there is no magnetic field acting on the moving part (12) when the electromagnet (15) is deactivated,
    the moving part (12) includes an axle and a disc-shaped portion (17) extending in a radial direction and facing the electromagnet (15) in the axial direction,
    a single spring (24) is radially-positioned around the moving part (12), with the disc-shaped portion (17) of the moving part (12) axially situated immediately between the electromagnet (15) and the spring (24), wherein the moving part (12) reciprocates towards either the spring (24) or electromagnet (15),
    the at least one position sensor includes at least one optical transmitter (2) and at least one optical receiver (3) located immediately adjacent to a side of the spring (24) which is opposite the side of the spring (24) which faces the disc-shaped portion (17) of the moving part (12),
    the moving part (12) of the pump is positioned to move between and shade light between the at least one optical transmitter (2) and the at least one optical receiver (3) with a size of a shaded area depending on the position of the moving part (12),
    the microprocessor (1) is set to continuously calculate, in relation to the size of the shaded area, instantaneous position of the moving part (12) from the size of the shaded area, which corresponds to voltage at the at least one optical receiver (3); and
    wherein the microprocessor is set to continuously control said instantaneous position of the moving part (12) by activating or deactivating the energy feed to the electromagnet (15) and prevent the disc-shaped portion (17) from striking the electromagnet (15), and the electromagnetic driven pump additionally comprising
    a membrane (18) to which the moving part (12) is fastened, and
    first and second flanges (20, 19) situated to clamp the membrane (18) therebetween to an end of the axially-extending moving part (12) on a side of the electromagnet (15) opposite the disc-shaped portion (17) to form a pump chamber between the first flange (20) and the membrane (18), the pump chamber having an inlet and an outlet.

2. The electromagnetic driven pump according to claim 1, wherein the moving part in all positions shades the light between the at least one optical transmitter and at least one optical receiver.

3. The electromagnetic driven pump according to claim 1, wherein the microprocessor (1), for automatic calibration of a position sensor function, is designed to record the voltage from the at least one optical receiver (3) with the moving part pulled by the electromagnet (15) to at least one known position.

4. The electromagnetic driven pump according to claim 1, wherein the at least one sensor measures pressure found in the pump chamber of the electromagnetic driven pump by measuring acceleration of the moving part (12) during a stroke of the electromagnetic driven pump.

5. The electromagnetic driven pump according to claim 1, wherein the microprocessor (1) is connected to a current sensor (9) which is designed to record current that passes through the electromagnet (15).

6. The electromagnetic driven pump according to claim 1, wherein the microprocessor (1) is connected to a temperature sensor (4) to use measured temperature data for temperature compensation of the control system.

7. The electromagnetic driven pump according to claim 1, wherein the microprocessor (1) is designed to be controlled by an incoming voltage level that is measured by a voltmeter (5).

8. The electromagnetic driven pump according to claim 1, comprising a function where the pump is driven with constant frequency and flow is varied stroke length of the moving part (12).

9. The electromagnetic driven pump according to claim 1, comprising a function for control of the pump to produce single strokes of variable length.

10. The electromagnetic driven pump according to claim 1, designed to use flow measurement to control the pump with a linear function for flow proportional against an incoming voltage.

11. The electromagnetic driven pump according to claim 1, designed to use pressure measurement to control the pump with a linear function for pressure proportional against an incoming voltage.

12. The electromagnetic driven pump according to claim 1, wherein the at least one optical transmitter is configured to flash repetitively.

13. The electromagnetic driven pump according to claim 1, additionally comprising
    a gable (22),
    with the first flange (20) situated between the membrane (18) and the gable (22).

14. The electromagnetic driven pump according to claim 13, additionally comprising a check valve (21) situated between the gable (22) and the first flange (20).

15. A method for controlling an electromagnetically-driven pump having a control system including a microprocessor (1) and at least one position sensor, comprising the steps of controlling energy feed to a single electromagnet (15) with the microprocessor (1), thereby causing changes in an emitted magnetic field to reciprocate a moving part (12) of the pump to achieve a pumping effect, with the at least one position sensor being placed to sense the position of the moving part (12) of the electromagnetically-driven pump, orienting the electromagnet (15) to direct the emitted magnetic field entirely in an axial direction of the moving part (12) when activated, there being no magnetic field acting on the moving part (12) when the electromagnet (15) is deactivated, the moving part (12) including an axle and a disc-shaped portion (17) extending in a radial direction and facing the electromagnet (15) in the axial direction, the at least one position sensor including at least one optical transmitter (2) and at least one optical receiver (3), a single spring (24) radially-positioned around the moving part (12), with the disc-shaped portion (17) of the moving part (12) axially situated immediately between the electromagnet (15) and the spring (24), reciprocating the moving part (12) towards either the spring (24) or electromagnet (15) and the at least one optical transmitter (2) and receiver (3) located immediately adjacent to a side of the spring (24) which is opposite the side of the spring (24) facing the disc-shaped portion (17) of the moving part (12), a membrane (18) fastened to the moving part (12), with first and second flanges (20, 19) clamping the membrane (18) therebetween to an end of the axially-extending moving part (12) on a side of the electromagnet (15) opposite the disc-shaped portion (17) to form a pump chamber between the first flange (20) and membrane (18), the pump chamber having an inlet and an outlet, measuring values from the at least one position sensor with the microprocessor (1), incrementally sensing position and movement of the moving part (12) between the at least one optical transmitter (2) and the at least one optical receiver (3) with a size of a shaded area depending on the position of the moving part (12), and continuously calculating with the microprocessor (1), in relation to the size of the shaded area, instantaneous position of the moving part (12) and adjusting the control of the energy feed to the single electromagnet (15) to continuously control said instantaneous position of the moving part (12) by activating or deactivating the electromagnet (15) according to a desired performance of the pump and preventing the disc-shaped portion (17) from striking the electromagnet (15).

\* \* \* \* \*